United States Patent
Takahashi

(10) Patent No.: US 10,590,915 B2
(45) Date of Patent: Mar. 17, 2020

(54) CONDITION MONITORING SYSTEM FOR WIND TURBINE

(71) Applicant: NTN CORPORATION, Osaka-shi, Osaka (JP)

(72) Inventor: Toru Takahashi, Mie (JP)

(73) Assignee: NTN CORPORATION, Osaka (JP)

( * ) Notice: Subject to any disclaimer, the term of this patent is extended or adjusted under 35 U.S.C. 154(b) by 93 days.

(21) Appl. No.: 15/746,173

(22) PCT Filed: Jun. 24, 2016

(86) PCT No.: PCT/JP2016/068894
§ 371 (c)(1),
(2) Date: Jan. 19, 2018

(87) PCT Pub. No.: WO2017/013997
PCT Pub. Date: Jan. 26, 2017

(65) Prior Publication Data
US 2018/0223813 A1    Aug. 9, 2018

(30) Foreign Application Priority Data

Jul. 21, 2015 (JP) .................... 2015-143773

(51) Int. Cl.
*F03D 17/00* (2016.01)
*F03D 7/02* (2006.01)
(Continued)

(52) U.S. Cl.
CPC .......... *F03D 17/00* (2016.05); *F03D 7/0204* (2013.01); *F03D 80/82* (2016.05); *G01C 17/02* (2013.01);
(Continued)

(58) Field of Classification Search
CPC ........ F03D 17/00; F03D 7/0204; F03D 80/82; G01C 17/02; G01H 11/02; F05B 2270/80; F05B 2270/329; Y02E 10/723
(Continued)

(56) References Cited

U.S. PATENT DOCUMENTS 8,264,235 B2 *   9/2012   De Vries ................. H01L 22/34
                                                             324/525
2004/0151575 A1   8/2004   Pierce et al.
(Continued)

FOREIGN PATENT DOCUMENTS

CN        1823223 A      8/2006
CN      104600904 A      5/2015
(Continued)

OTHER PUBLICATIONS

Search Report issued in corresponding International Patent Application No. PCT/JP2016/068894, dated Sep. 20, 2016.
(Continued)

*Primary Examiner* — Giovanni Astacio-Oquendo
(74) *Attorney, Agent, or Firm* — McDermott Will & Emery LLP

(57) ABSTRACT

A condition monitoring system for a wind turbine generator includes an orientation sensor installed in a nacelle and configured to detect an orientation of the nacelle and a condition monitoring unit configured to receive an output from the orientation sensor and perform at least any one of recording, analysis, or transmission of a signal. The condition monitoring unit preferably detects, based on the output from the orientation sensor, the movement along the rotation direction of the nacelle associated with a torsional oscillation of the tower. The orientation sensor can also detect slow directional fluctuations that are difficult to detect using an acceleration sensor or the like, and thus, can satisfactorily
(Continued)

detect the rotation of the nacelle associated with the torsional oscillation of the tower.

5 Claims, 4 Drawing Sheets

(51) Int. Cl.
*F03D 80/80* (2016.01)
*G01C 17/02* (2006.01)
*G01H 11/02* (2006.01)

(52) U.S. Cl.
CPC ........ *G01H 11/02* (2013.01); *F05B 2270/329* (2013.01); *F05B 2270/80* (2013.01); *Y02E 10/723* (2013.01)

(58) Field of Classification Search
USPC ................................ 324/207.25, 207.11, 200
See application file for complete search history.

(56) References Cited

U.S. PATENT DOCUMENTS

| | | | |
|---|---|---|---|
| 2004/0151584 A1 | 8/2004 | Blakemore | |
| 2007/0176428 A1 | 8/2007 | Nagao | |
| 2008/0232181 A1* | 9/2008 | Higashi | G11C 7/1051 365/201 |
| 2012/0156034 A1* | 6/2012 | Sabannavar | G01M 13/028 416/1 |
| 2012/0187683 A1 | 7/2012 | Wohlleb | |
| 2013/0049363 A1* | 2/2013 | Smith | H02P 21/00 290/44 |
| 2013/0297085 A1* | 11/2013 | Xiongzhe | F03D 7/0276 700/287 |
| 2015/0116131 A1 | 4/2015 | Ikeda et al. | |
| 2015/0226182 A1* | 8/2015 | Mazur | F03D 80/70 290/55 |
| 2016/0215764 A1 | 7/2016 | Sakaguchi | |
| 2017/0030984 A1* | 2/2017 | Deng | G01R 33/16 |
| 2017/0059645 A1* | 3/2017 | Pan | G01R 31/2607 |

FOREIGN PATENT DOCUMENTS

| | | |
|---|---|---|
| JP | S57-149456 U | 9/1982 |
| JP | H11-193774 A | 7/1999 |
| JP | 2005-036749 A | 2/2005 |
| JP | 2007-205225 A | 8/2007 |
| JP | 2012-154336 A | 8/2012 |
| JP | 2013-087732 A | 5/2013 |
| JP | 2013-185507 A | 9/2013 |
| JP | 2015-72006 A | 4/2015 |
| WO | 2005/010358 A1 | 2/2005 |

OTHER PUBLICATIONS

Mao Ben et al., "Micro Inertial Navigation System and Its Application," Harbin Engineering University Press, published on Jul. 31, 2013, with translation of bibliographic information.

Wang Bin-bin et al., "Design of Ultrasonic Wind Velocity Measurement System Based on Time-Difference Method,"Jilin Institute of Chemical Technology, Physical Experiment of College, vol. 26., No. 4, published on Aug. 26, 2013, with English translation of bibliographic information and English abstract.

Office Action issued in corresponding Chinese Patent Application No. 201680042334.2, dated Apr. 19, 2019, with English translation.

Notice of Grounds of Rejection issued in corresponding Japanese Patent Application No. 2015-143773, dated Dec. 10, 2019, with English translation.

* cited by examiner

US 10,590,915 B2

CONDITION MONITORING SYSTEM FOR WIND TURBINE

CROSS REFERENCE

This application is the U.S. National Phase under 35 U.S.C. § 371 of International Application No. PCT/JP2016/068894, filed on Jun. 24, 2016, which claims the benefit of Japanese Application No. 2015-143773, filed on Jul. 21, 2015, the entire contents of each are hereby incorporated by reference.

TECHNICAL FIELD

The present invention relates to a condition monitoring system for a wind turbine generator.

BACKGROUND ART

A wind turbine generator is known as an electric power generator that generates power using a clean energy source.

In the wind turbine generator, a supervisory control and data acquisition (SCADA) system, a condition monitoring system (CMS), or any other system remotely monitors the operating condition of a wind turbine. The SCADA collects the operating information such as a power generation amount of the wind turbine and a wind velocity, and the CMS monitors, for example, the damaged or deteriorated condition of the equipment.

The information collected by the CMS includes oscillation data. The oscillation data is frequently measured by an acceleration sensor including, for example, a piezoelectric element. Such an acceleration sensor has a response frequency limited to, for example, 40 Hz to 8 kHz.

It is therefore difficult to detect low-frequency oscillations below 40 Hz using a common oscillation sensor.

Japanese Patent Laying-Open No. 2013-087732 (PTD 1) discloses a system that monitors the condition of a wind turbine generator using a simple sensor capable of detecting such low-frequency oscillations.

CITATION LIST

Patent Document

PTD 1: Japanese Patent Laying-Open No. 2013-087732

SUMMARY OF INVENTION

Technical Problem

One example of the low-frequency oscillations is an oscillation that occurs in a nacelle due to a torsional oscillation of the tower of a wind turbine generator.

Although the low-frequency oscillation sensor disclosed in Japanese Patent Laying-Open No. 2013-087732 (PTD 1) above can detect pitching oscillations caused by the deflection of the upper end of the tower in the anterior-posterior or horizontal direction, it has difficulty in detecting torsional oscillations. It is difficult to apply a high-sensitivity acceleration sensor for low frequencies, which is relatively costly and large in size.

The present invention has been made to solve the above-mentioned problems, and has an object to provide a condition monitoring system for a wind turbine generator that can detect low-frequency oscillations by an inexpensive sensor.

Solution to Problem

In summary, the present invention is a condition monitoring system for a wind turbine generator in which a nacelle is placed at a top of a tower, and includes an orientation sensor installed on the nacelle and configured to detect an orientation of the nacelle, and a condition monitoring unit configured to receive an output from the orientation sensor and perform at least any one of recording, analysis, and transmission of a signal.

This system includes the orientation sensor, and thus, can detect the orientation of the nacelle of the wind turbine generator inexpensively and easily.

The condition monitoring unit preferably detects, based on the output from the orientation sensor, the movement along the rotation direction of the nacelle associated with the torsional oscillation of the tower. The orientation sensor preferably includes a magnetic sensor that detects terrestrial magnetism.

The orientation sensor can also detect slow directional fluctuations that are difficult to detect using an acceleration sensor or the like, and thus, can satisfactorily detect the rotation of the nacelle associated with a torsional oscillation of the tower.

The condition monitoring unit preferably determines an average value for each fixed period of time from the signal output from the orientation sensor and calculates orientation data on the nacelle.

Consequently, the approximate orientation of the nacelle can be detected correctly even when the orientation of the nacelle changes due to a torsional oscillation of the tower.

The condition monitoring unit preferably monitors the torsional oscillation of the tower by extracting a component of not more than a predetermined frequency from the signal output from the orientation sensor.

Consequently, the components of the torsional oscillation can be separated from the signal output from the orientation sensor.

Preferably, the condition monitoring system further includes a housing which houses the condition monitoring unit, and which houses the orientation sensor or to which the orientation sensor is mounted.

The orientation sensor, if using magnetism, should not be placed close to, for example, a cable through which a large current flows in the wind turbine generator; otherwise, it has fewer limitations on its installation place. Thus, when the orientation sensor is housed with the condition monitoring unit in the same housing or is mounted to the housing, the installation of the orientation sensor completes at the same time with the completion of the installation of the housing for the condition monitoring system, thus simplifying the work of installing the orientation sensor.

Advantageous Effects of Invention

The present invention can, for example, monitor a low-frequency rotation of a nacelle by an inexpensive system.

DESCRIPTION OF EMBODIMENTS

Figure 1:
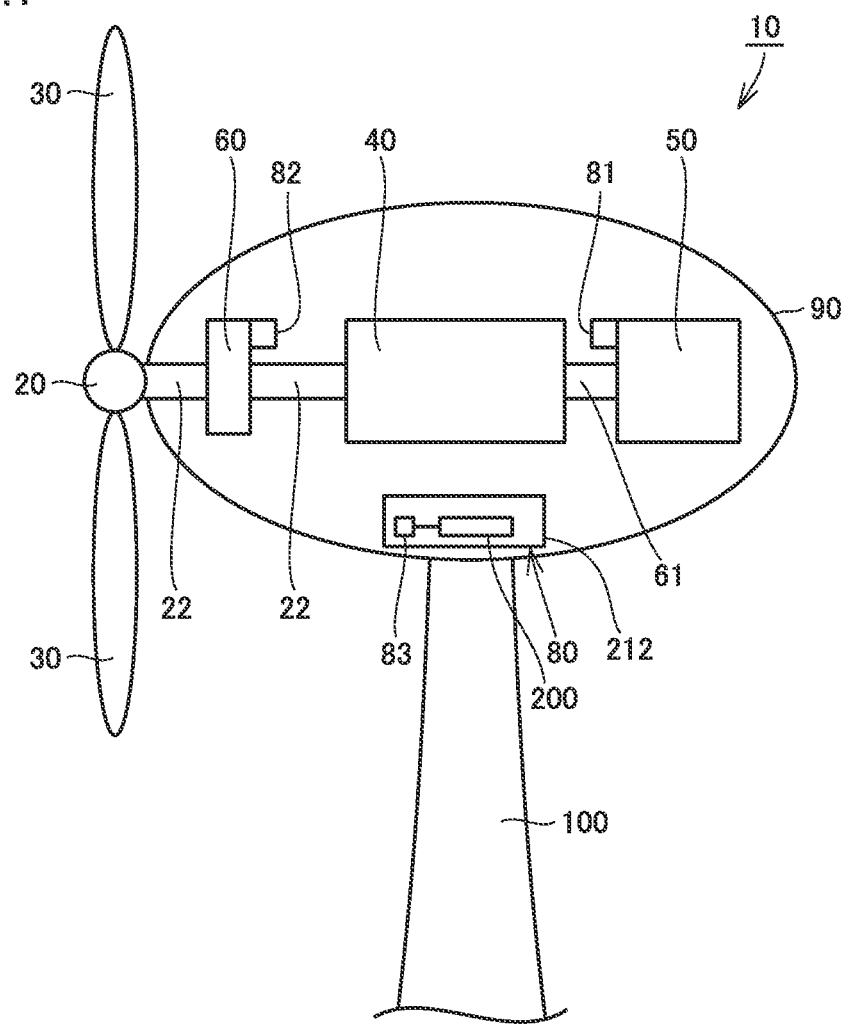
FIG. 1 is a diagram for illustrating a wind turbine generator using an abnormality diagnosis apparatus of an embodiment.

An embodiment of the present invention will now be described with reference to the drawings. The same or corresponding parts are denoted by the same reference symbols in the drawings, and description thereof will not be repeated.

FIG. 1 is a diagram for illustrating a wind turbine generator using an abnormality diagnosis apparatus of the present embodiment.

With reference to FIG. 1, a nacelle 90 is provided at the upper end of a tower 100. A plurality of blades 30 are attached to a rotor head 20. Rotor head 20 is connected to the tip of a main shaft 22. Main shaft 22 is supported inside nacelle 90. The rotation of main shaft 22 is transmitted to an electric power generator 50 via a speed-up gear 40.

The wind turbine generator is configured to be capable of creating a yaw motion for rotating nacelle 90 in accordance with a wind direction with respect to tower 100 secured to the ground. Nacelle 90 is preferably rotated such that a portion thereof close to blades 30 is located windward.

Wind turbine generator 10 changes an angle (hereinafter referred to as a pitch) of blade 30 to the wind direction in accordance with the intensity of wind power, thereby obtaining a moderate rotation. The blade pitch is also controlled similarly when the wind turbine is activated or stopped. Each blade 30 is also controlled to swing several degrees during one rotation of the main shaft. This allows the adjustment of an energy amount that can be obtained from the wind. During gales, for example, a wind catching surface (also referred to as a wing surface or blade surface) is made parallel to the wind direction to reduce the rotation of the wind turbine.

Figure 2:
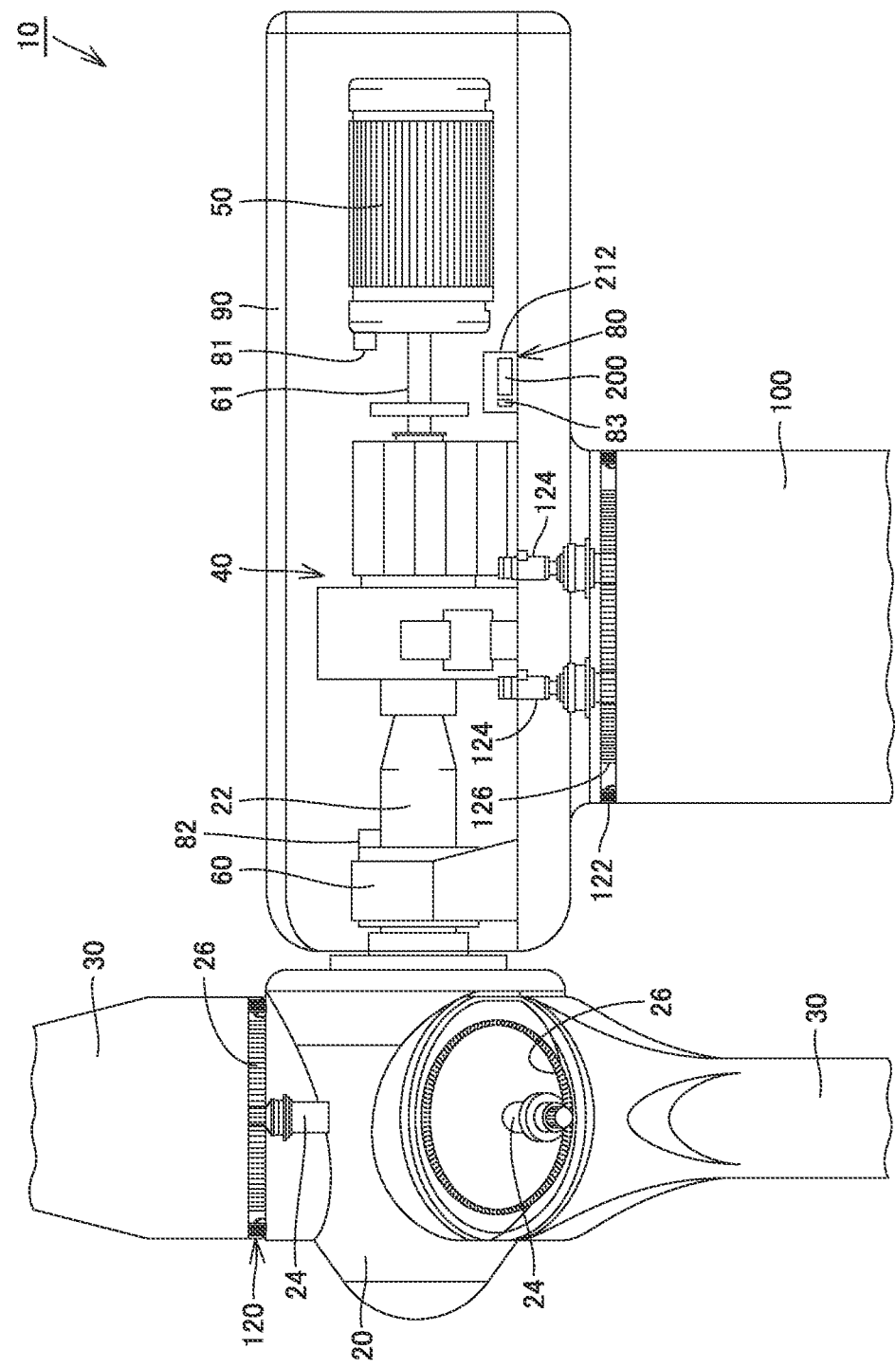
FIG. 2 shows the structure inside a nacelle in more detail.

FIG. 2 shows the construction inside the nacelle in more detail. With reference to FIGS. 1 and 2, wind turbine generator 10 includes main shaft 22, blades 30, speed-up gear 40, electric power generator 50, a main bearing 60, and a condition monitoring system 80. Speed-up gear 40, electric power generator 50, main bearing 60, and condition monitoring system 80 are housed in nacelle 90, and nacelle 90 is supported by tower 100.

Main shaft 22 extends from rotor head 20 into nacelle 90 and is connected to the input shaft of speed-up gear 40 to be rotatably supported by main bearing 60. Main shaft 22 then transmits the rotation torque generated by blades 30 that have received wind power to the input shaft of speed-up gear 40. Blades 30 are provided to the tip of main shaft 22 and convert wind power into a rotation torque and transmit the rotation torque to main shaft 22.

Main bearing 60 is fixedly attached in nacelle 90 and rotatably supports main shaft 22. Main bearing 60 is a roller bearing. Main bearing 60 is, for example, a self-centering roller bearing, a conical roller bearing, a cylindrical roller bearing, a ball bearing, or any other bearing. These bearings may be of a single row or double rows.

Speed-up gear 40 is provided between main shaft 22 and power generator 50, and increases the speed of rotation of main shaft 22 and outputs it to power generator 50. In one example, speed-up gear 40 is composed of a gear speed-up mechanism including a planetary gear, an intermediate shaft, a high-speed shaft, and the like. Note that although not shown in the figure, speed-up gear 40 is also internally provided with a plurality of bearings that rotatably support a plurality of shafts. Generator 50 is connected to an output shaft 61 of speed-up gear 40 and generates electric power by the rotation torque received from speed-up gear 40. Power generator 50 is, for example, an induction power generator. Note that power generator 50 is also internally provided with a bearing that rotatably supports a rotor.

A nacelle rotation mechanism includes drives 124 for changing the orientation of the nacelle that are attached to nacelle 90, and a ring gear 126 that is rotated by pinion gears fitted with the rotating shafts of drives 124. Ring gear 126 is attached to tower 100 while being fixed thereto.

The nacelle rotation mechanism changes (adjusts) the orientation of nacelle 90. At the boundary between nacelle 90 and tower 100, a bearing 122 for supporting the nacelle is provided. Nacelle 90 is supported by bearing 122 and rotates about the axis of rotation of bearing 122. Such a rotation of nacelle 90 about the central shaft of the tower is referred to as a yaw motion or yawing. The yaw motion is detected by condition monitoring system 80 placed in nacelle 90.

Condition monitoring system 80 includes an orientation sensor 83, a condition monitoring unit 200, and a housing 212 that houses orientation sensor 83 and condition monitoring unit 200. Orientation sensor 83 has a small size and can be placed at any location relatively freely. Orientation sensor 83 may be mounted on an electronic circuit board of condition monitoring unit 200. Alternatively, orientation sensor 83 may be externally mounted to housing 212. Placing orientation sensor 83 in housing 212 or mounting it to housing 212 can save the labor required for mounting orientation sensor 83 in placing condition monitoring system 80 in an existing wind turbine generator.

Orientation sensor 83 may be, for example, a sensor capable of detecting an orientation based on the terrestrial magnetism. Recent smartphones or the like have an electronic compass (digital compass). Orientation sensor 83 may be an electronic compass module having two magnetic sensors that detect changes in terrestrial magnetism using two axes in the XY directions, or an electronic compass module having three magnetic sensors that detect changes in terrestrial magnetism using three axes in the XYZ directions, because such an electronic compass is available at low cost.

In the present embodiment, an output from orientation sensor 83 is used to detect the orientation of nacelle 90 and is also used to detect the rotation of nacelle 90 due to a torsional oscillation of the tower.

Figure 3:
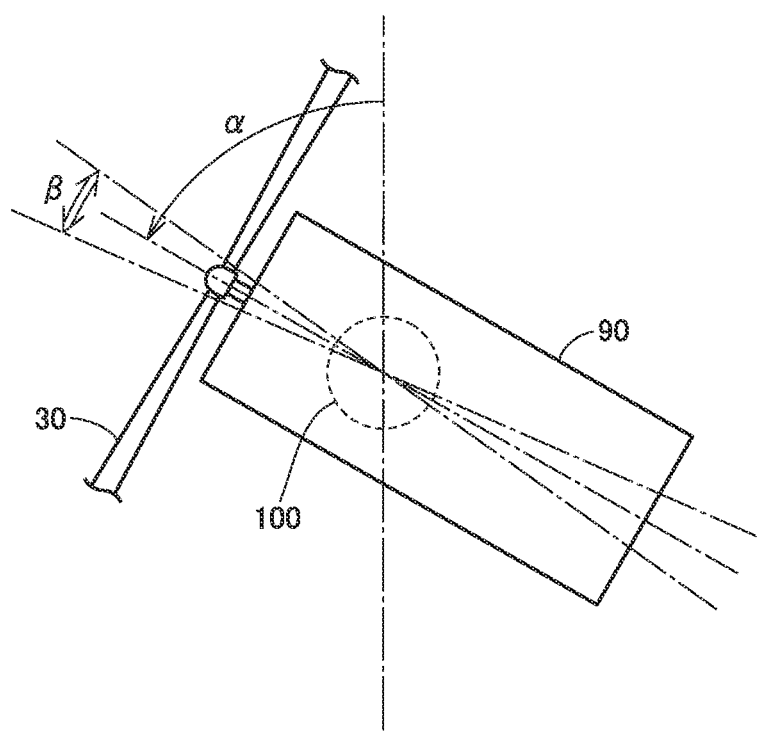
FIG. 3 is a diagram for illustrating the rotation of a nacelle caused by the torsional oscillation of a tower.

FIG. 3 is a diagram for illustrating the rotation of the nacelle caused by a torsional oscillation of the tower, which is a diagram showing nacelle 90 from above. With reference to FIGS. 2 and 3, drives 124 for changing the nacelle's orientation adjust an angle $\alpha$ in accordance with the wind direction such that blades 30 catch the wind from the front.

However, even when angle $\alpha$ is adjusted in accordance with the wind direction, blades 30 may catch a sudden gust of wind from the lateral side. Nacelle 90 moves along a rotational direction accordingly, generating torsional oscillations in tower 100. Consequently, low-frequency oscillations in the rotational direction occur in nacelle 90 within the range of an angle $\beta$. Upon generation of oscillations in the rotational direction, angle $\alpha$ in FIG. 3 fluctuates to increase or decrease.

In the present embodiment, condition monitoring system 80 detects the direction (which corresponds to angle $\alpha$) to which nacelle 90 is pointed, and monitors oscillations (which correspond to angle $\beta$) while reflecting the relationship between the wind direction and the oscillating condition of the equipment.

To detect the direction to which nacelle 90 is pointed, condition monitoring system 80 uses orientation sensor 83. Orientation sensor 83 may be an electronic compass capable of detecting the terrestrial magnetism for use in, for example, mobile phones.

Signals measured by orientation sensor 83, which is placed in the nacelle, can be used as input data of condition monitoring unit 200.

Figure 4:
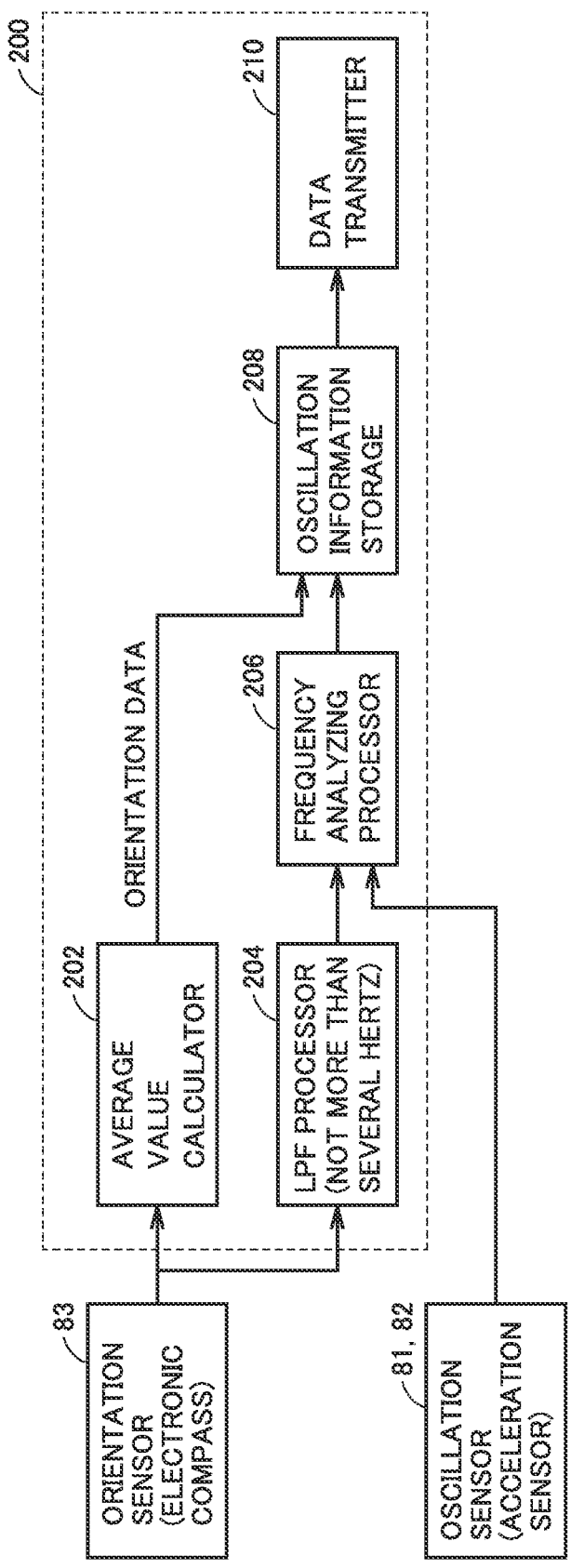
FIG. 4 is a block diagram showing a configuration of a condition monitoring unit 200.

FIG. 4 is a block diagram showing a configuration of condition monitoring unit 200. Condition monitoring unit 200 receives signals from orientation sensor 83 and oscillation sensors 81 and 82 and monitors the wind turbine generator.

With reference to FIG. 4, condition monitoring unit 200 receives an output from orientation sensor 83 and outputs from oscillation sensors 81 and 82, and performs the processing of recording, analyzing, and transmitting the oscillation data on the wind turbine generator. Condition monitoring unit 200 includes an average value calculator 202, a low-pass filter (LPF) processor 204, a frequency analyzing processor 206, an oscillation information storage 208, and a data transmitter 210.

Average value calculator 202 performs the processing of removing noise by determining an average in a fixed period of time from the signal of orientation sensor 83 (electronic compass) in order to determine the orientation of nacelle 90. Specifically, the average value calculator regularly samples n signals of orientation sensor 83 in a fixed period of time and divides the sum of angles α indicated by the sampled signals by n to calculate an average value. The average value indicates the original direction to which the nacelle should be pointed if no torsional oscillations occur.

LPF processor 204 extracts low-frequency variation components of not more than several hertz from the signals output from orientation sensor 83 (electronic compass) in a long period of time ranging from several tens of seconds to several minutes. The extracted signals are analyzed in frequency analyzing processor 206, so that the manner of the nacelle slowly changing its direction is observed, allowing the determination of the low-frequency oscillation components of the nacelle. The frequency band that is cut off by LPF processor 204 is set to an appropriate value corresponding to the structure of tower 100, nacelle 90, or the like.

Oscillation information storage 208 stores the orientation data calculated by average value calculator 202, the low-frequency oscillation data in the rotation direction of nacelle 90 which has been analyzed by frequency analyzing processor 206, and the oscillation data, which has been detected by oscillation sensors 81 and 82 and analyzed by frequency analyzing processor 206, associated with the rotation of the blade of the wind turbine.

Data transmitter 210 transmits the oscillation information stored in oscillation information storage 208 by radio, for example, from nacelle 90 to an observatory or the like as required.

In the observatory, the information acquired from the normal signals of oscillation sensors 81 and 82 is combined with the information acquired from the signal of orientation sensor 83 for comprehensive analysis and determination where oscillation components of not more than several hertz are included.

Condition monitoring unit 200 is not limited to the above configuration separated into blocks and may also be implemented through the processing performed by software using a computer including a CPU, storage, input/output buffer, and the like. Alternatively, condition monitoring unit 200 may be configured as dedicated hardware (electronic circuit).

Even the low-frequency oscillations that are difficult to detect using oscillation sensors 81 and 82 can be detected by orientation sensor 83 in the present embodiment, as described above. For example, a slight fluctuation in the orientation of nacelle 90 due to torsional oscillations of tower 100 or the like can be detected with high sensitivity based on a change in the direction of the terrestrial magnetism.

Orientation sensor 83 may include a plurality of magnetic detector elements. These magnetic detector elements may be arranged to detect changes in the magnetism in the direction in which these elements are orthogonal to each other and may be configured to detect the rotational motions in directions of two or three axes. Alternatively, orientation sensor 83 in which integrated biaxial or triaxial magnetic detector elements are mounted as a device of an electronic compass may be provided with a similar function. The use of an inexpensive electronic compass enables the extraction of low-frequency oscillation components that were previously difficult to obtain.

The extracted low-frequency oscillation information can be used as follows.

First Example Use

An amplitude change in the torsional oscillation of tower 100 that has been detected by orientation sensor 83 is determined, and if a change amount is large, information about the operating condition of the wind turbine, such as "under the influence of wind hitting blade 30 (turbulence in the wind direction)", is extracted, and then, warning information is output.

The control of a blade pitch variable mechanism can be changed based on this information. Referring again to FIG. 2, the blade pitch variable mechanism will be described. The blade pitch variable mechanism includes drives 24 for blade pitch change, which are mounted close to the rotor head, and ring gears 26, which are rotated by pinion gears fitted with the rotating shafts of drives 24. Ring gear 26 is fixedly attached to blade 30 while being fixed thereto.

The blade pitch variable mechanism swings blades 30 and changes (adjusts) the pitches of blades 30. Herein, blades 30 are provided with blade bearings 120 at their proximal ends. Each blade 30 is supported by blade bearing 120 and rotates about the axis of rotation of blade bearing 120.

When electric power generator 50 is under load, the pitches of blades 30 are set such that an angle between the wind direction and the wind catching surface of blade 30 is an angle θ (≠0). The wind catching surface of blade 30 accordingly receives energy from the wind. Blades 30 then rotate with respect to tower 100 together with rotor head 20, where main shaft 22 connected to rotor head 20 serves as an axis. The rotation of this rotating shaft is transmitted to the electric power generator, thus generating electric power.

Although the pitches of blades 30 are changed such that the wind catching surfaces of blades 30 are parallel to the wind direction during gales, for example, whether the wind is a gale needs to be determined differently at a different installation place. For example, at places where a side wind caused by a gust occurs frequently due to the topography, a wind velocity at which a wind is determined as a gale is preferably lowered.

The low-frequency oscillation components extracted from the output of orientation sensor 83 can be used to determine whether a side wind has occurred due to a gust as described above. Specifically, a wind is determined as a gale when the intensity of low-frequency oscillation components exceeds a predetermined threshold. Consequently, wind turbine generator 10 can be prevented from breakage due to an abnormal increase in the rotational velocities of blade 30 and rotor head 20.

Second Example Use

The characteristic frequency of a structure can be estimated by extracting conspicuous frequency components through frequency analysis from the oscillation components detected by orientation sensor 83. Since an abnormality such as a change in structure's intensity is suspected if this frequency changes, this frequency can be monitored for a long period of time and used for estimation of an abnormality.

Specifically, for example, if the characteristic frequency estimated from oscillation components goes outside an allowable range, warning information is output. The observer, who views this warning information, can go to the site for inspection.

Modifications

The embodiment above has illustrated a sensor (such as an electronic compass) that determines an orientation based on terrestrial magnetism as orientation sensor 83. However, orientation sensor 83 can be any sensor capable of detecting a change in the rotational angle α in FIG. 3. For example, orientation sensor 83 may be a gyro sensor. The gyro sensor has been widely used in, for example, preventing shaking in a camera, detecting a motion in a game console, or measuring a vehicle's attitude.

A low-frequency yaw motion of a nacelle can be monitored similarly also in such a modification.

Finally, the present embodiment will be summarized referring again to the drawings. A condition monitoring system 80 of a wind turbine generator includes an orientation sensor 83 that is mounted in a nacelle 90 and detects the orientation of nacelle 90 and a condition monitoring unit 200 that receives an output from orientation sensor 83 and performs at least any one of recording, analysis, and transmission of a signal. Condition monitoring unit 200 preferably detects, based on the output from orientation sensor 83, the movement along the rotational direction of nacelle 90 associated with a torsional oscillation of a tower 100.

Orientation sensor 83 can also detect slow directional fluctuations that are difficult to detect using an acceleration sensor or the like, and thus, can excellently detect the movement along the rotational direction of nacelle 90 associated with a torsional oscillation of tower 100.

Condition monitoring unit 200 preferably determines an average value for each period of time from a signal output from orientation sensor 83 and calculates the orientation data on nacelle 90.

Consequently, the approximate orientation of nacelle 90 can be detected correctly even when the orientation of nacelle 90 changes due to a torsional oscillation of tower 100.

Condition monitoring unit 200 preferably monitors the torsional oscillation of tower 100 by extracting components of not more than a predetermined frequency (for example, several hertz) from the signal output from orientation sensor 83.

Consequently, components of the torsional oscillation can be separated from the signal output from orientation sensor 83.

Preferably, condition monitoring system 80 further includes a housing 212 that houses orientation sensor 83 and condition monitoring unit 200.

The orientation sensor, if using magnetism, should not be placed close to, for example, a cable through which a large current flows in the wind turbine generator; otherwise, it has fewer limitations on its installation place. Thus, when the orientation sensor is housed together with condition monitoring unit 200 in the same housing 212 or is mounted to housing 212, the installation of orientation sensor 83 completes at the same time with the completion of the installation of housing 212 for condition monitoring system 80, thus simplifying the work of installing condition monitoring system 80.

It should be understood that the embodiments disclosed herein have been described for the purpose of illustration only and in a non-restrictive manner in any respect. The scope of the present invention is defined by the terms of the claims, rather than the description above, and is intended to include any modifications within the meaning and scope equivalent to the terms of the claims.

REFERENCE SIGNS LIST 10 wind turbine generator, 20 rotor head, 22 main shaft, 24, 124 drive, 26, 126 ring gear, 30 blade, 40 speed-up gear, 50 electric power generator, 60 main bearing, 80 condition monitoring system, 81, 82 oscillation sensor, 83 orientation sensor, 90 nacelle, 100 tower, 120 blade bearing, 122 bearing, 200 condition monitoring unit, 202 average value calculator, 204 processor, 206 frequency analyzer and processor, 208 oscillation information storage, 210 data transmitter, 212 housing.

The invention claimed is:

1. A condition monitoring system for a wind turbine generator in which a nacelle is placed at a top of a tower, the condition monitoring system comprising:
an orientation sensor placed in the nacelle and configured to detect an orientation of the nacelle; and
a condition monitoring unit configured to receive an output from the orientation sensor and perform at least any one of recording, analysis, or transmission of a signal,
wherein the condition monitoring unit is configured to detect, based on the output from the orientation sensor, movement along a rotational direction of the nacelle associated with a torsional oscillation of the tower.

2. The condition monitoring system for a wind turbine generator according to claim 1, wherein the orientation sensor includes a magnetic sensor configured to detect terrestrial magnetism.

3. The condition monitoring system for a wind turbine generator according to claim 1, wherein the condition monitoring unit is configured to determine an average value for each fixed period of time from a signal output from the orientation sensor and calculate orientation data on the nacelle.

4. The condition monitoring system for a wind turbine generator according to claim 1, wherein the condition monitoring unit is configured to monitor a torsional oscillation of the tower by extracting a component of not more than a predetermined frequency from the signal output from the orientation sensor.

5. The condition monitoring system for a wind turbine generator according to claim 1, further comprising a housing configured to house the condition monitoring unit, the housing being configured to house the orientation sensor or the orientation sensor being attached to the housing.

\* \* \* \* \*